Feb. 11, 1947.        C. H. WATKINS ET AL        2,415,717
ALKYLATION OF ISOPARAFFINS BY MIXTURES OF ETHYLENE AND PROPYLENE
Filed April 4, 1944

FLOW DIAGRAM OF CONVENTIONAL METHOD

FLOW DIAGRAM OF PREFERRED METHOD

Charles H. Watkins
Richard N. Meinert   INVENTORS
BY  C. H. Young   ATTORNEY

Patented Feb. 11, 1947

2,415,717

UNITED STATES PATENT OFFICE 2,415,717

ALKYLATION OF ISOPARAFFINS BY MIXTURES OF ETHYLENE AND PROPYLENE

Charles H. Watkins, Cranford, and Richard N. Meinert, Westfield, N. J., assignors to Standard Oil Development Company, a corporation of Delaware Application April 4, 1944, Serial No. 529,430

8 Claims. (Cl. 260—683.4)

Our invention relates to the novel features hereinafter disclosed in the specification and claims, reference being had to the accompanying drawing.

The main object of our invention is to improve the alkylation of isoparaffins, such as isobutane, with olefins containing not more than three carbon atoms by conducting the alkylation operation in a cheaper and more expeditious manner than has heretofore been accomplished.

It is a matter of record to alkylate isobutane or isopentane or various other branched chain paraffin hydrocarbons with ethylene or propylene employing an aluminum chloride-hydrocarbon complex. For example, in a prior application of Ralph M. Hill, Serial No. 515,640, filed December 27, 1943, there is described a method of alkylating isoparaffins with ethylene and propylene. We have now discovered that the alkylation operation as previously conducted can be improved where it is desired to alkylate an isoparaffin with a hydrocarbon stream containing ethylene and propylene, by first conducting the reaction so that only the propylene is alkylated in the first stage and thereafter conducting the alkylation of the ethylene in the second stage.

Figure 1:
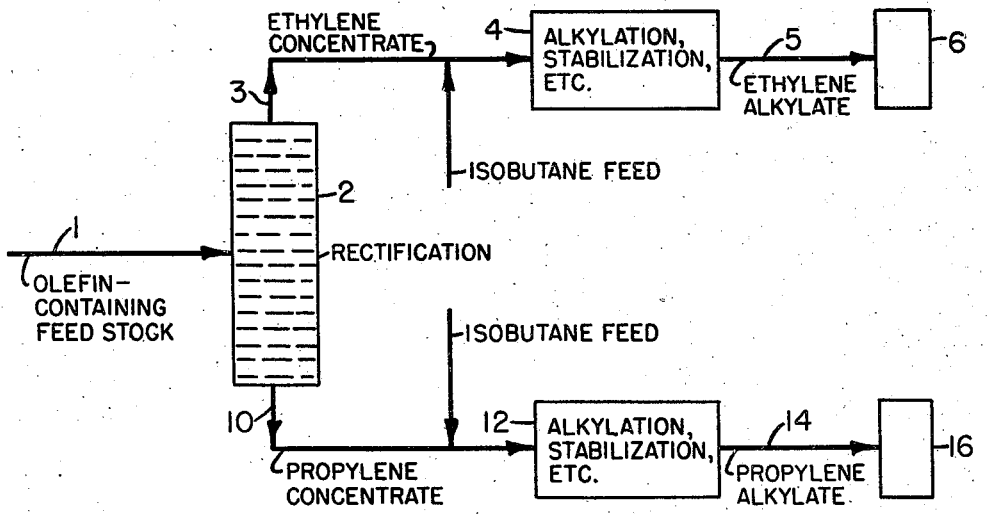
Figure 2:
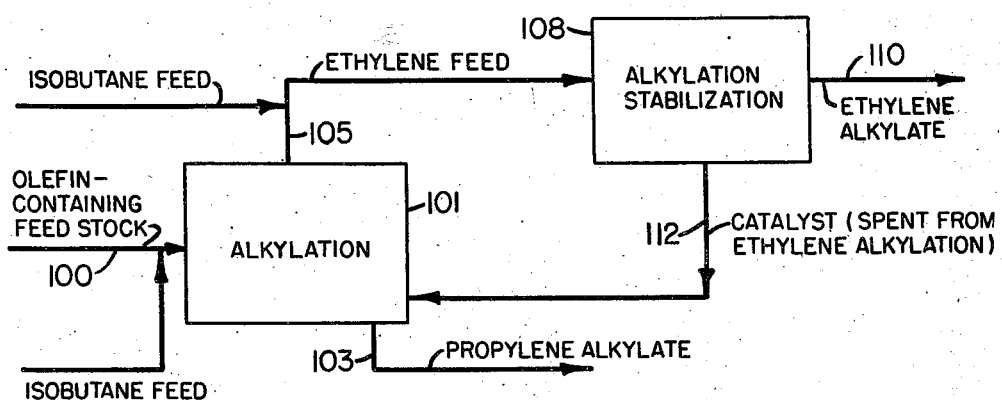

To afford a better understanding of our invention, we have shown diagrammatically in the drawing of Fig. 1, the conventional method for treating an olefin-containing feed stock which involves fractionating the feed stock into an ethylene concentrate and a propylene concentrate and separately alkylating these olefins; and in Fig. 2 we have shown diagrammatically by means of a flow plan our improved method for alkylating an olefin-containing feed stock in which both ethylene and propylene are present, but which differs from the conventional method of Fig. 1 in that we omit the original fractionation to separate the ethylene from the propylene and proceed to alkylate the propylene directly in the first stage and thereafter to withdraw the unchanged ethylene and alkylate the latter in a second stage.

Referring in detail to Fig. 1, the olefin-containing feed stock in the conventional method is introduced into the system through line 1 and conducted into a fractional distillation column 2 from which there is recovered overhead through line 3 an ethylene concentrate which is then subjected to alkylation, preferably using an aluminum chloride-hydrocarbon complex, stabilization, etc. in what we have indicated in the drawing to be 4, thereafter the ethylene alkylate is recovered through line 5 and collected in a receiving drum 6. Meanwhile the propylene concentrate is withdrawn from the distillation column 2 through line 10, subjected to alkylation, stabilization, etc., in 12, thereafter the propylene alkylate is recovered through line 14 and collected in receiving vessel 16.

In our method which is illustrated by a flow diagram in Fig. 2, the olefin-containing feed stock, which contains both ethylene and propylene, is introduced into the system through line 100, and the propylene is alkylated in 101 using aluminum chloride-hydrocarbon complex containing about 38 to 45% hydrocarbons and at temperatures within the range of about 50 to 90° F., and withdrawn from the system through line 103 as propylene alkylate product. During the alkylation of the propylene the ethylene is substantially unchanged and passes from the propylene alkylation system via line 105 to an ethylene alkylation and stabilization system 108 wherein the ethylene is alkylated, using an aluminum chloride-hydrocarbon complex containing about 35 to 40% hydrocarbons and at temperatures within the range from about 90 to 150° F. from which ethylene alkylate may be recovered as product through line 110. The spent catalyst from the ethylene alkylate may be withdrawn through line 112 and recycled to 101 where it can be used for the alkylation of propylene.

It will be understood that for purposes of simplicity we have omitted from the drawing many engineering expedients, such as pumps, preheaters, flow control valves, and the like, for these have been disclosed in the prior art and the actual alkylation of either the propylene or the ethylene, separately, is well known to those familiar with this art, and also the method of preparing the complex catalyst which is used. We may point out, however, that the catalyst is preferably one which is formed by reacting, say, the olefin, the isoparaffin, such as isobutane, and anhydrous aluminum chloride until it forms a brown mobile liquid containing from, say, 35–40% hydrocarbons. Catalyst promoters such as hydrogen chloride or volatile alkyl chlorides may be used in both stages of the alkylation. Furthermore, we wish to point out that the alkylation of the propylene is carried out in the first stage at a somewhat lower temperature and with a less active catalyst than is necessary in the second stage wherein the ethylene is alkylated. Thus a temperature of from, say, about 45–80° F. and sufficient pressure to keep the reactants in liquid state gives good results in the first or propylene alkylation stage, whereas in the second or ethylene alkylation stage, we operate at temperatures of from 100–150° F. and pressures just about sufficient to maintain the reactants in liquid state.

We have found that the aluminum chloride-hydrocarbon complex catalyst used causes the ethylene-isobutane alkylation reaction to proceed very slowly at a temperature below 110° F. and much slower below 100° F., whereas the optimum reaction temperature for propylene-isobutane alkylation using aluminum chloride-hydrocarbon complex catalyst is in the range of 50–70° F.

To recapitulate briefly, our present invention relates to improvements in the alkylation of isobutane with a mixed feed containing $C_2$ and $C_3$ olefins. We have found that it is not necessary to separate these olefins by fractional distillation or other methods. On the contrary, we may alkylate an isoparaffin with the propylene in the presence of ethylene in the first stage, withdraw the ethylene from the propylene alkylation stage and alkylate isobutane with the ethylene in a second alkylation stage. We have found that the unreacted gases passing from the first alkylation stage are substantially free of propylene and that the isobutane or other isoparaffin is alkylated in the second stage with practically only ethylene.

We deem it to be an advantage of our invention that it is possible to recover separately the ethylene alkylate, which has an especially high AFD–3C rating, and the propylene alkylate which has a much lower AFD–3C rating, without the necessity of separating the main ethylene-propylene feed stream by distillation or other means.

What we claim is:

1. A process for alkylating an isoparaffin with a mixed olefin feed containing ethylene and propylene which comprises contacting the said mixed olefin feed with isobutane and aluminum chloride-hydrocarbon complex containing about 38–45% hydrocarbons in a first reaction stage at temperatures within the range of from about 50–90° F. whereby the isobutane is alkylated by the propylene, withdrawing the propylene alkylate product, withdrawing the unreacted ethylene from the first stage and contacting said ethylene in a second stage with isobutane and aluminum chloride-hydrocarbon complex containing about 35–40% hydrocarbons at temperatures in the range of from 90–150° F. whereby the isoparaffin is alkylated with the ethylene, and recovering from said second stage an ethylene alkylate product.

2. The method of claim 1 in which the temperature in the first stage is from 50–70° F. and in the second stage from 110–125° F.

3. The method of claim 1 in which catalyst withdrawn from the second stage may be employed in the first stage.

4. The method of claim 1 in which the catalyst is promoted with a volatile alkyl chloride.

5. The method of claim 1 in which the catalyst in both stages is promoted with methyl chloride.

6. The method of claim 1 in which the catalyst is promoted with hydrogen chloride.

7. The method of claim 1 in which the catalyst is promoted in the first stage with methyl chloride and in the second stage with hydrogen chloride.

8. A process for alkylating an isoparaffin with a mixed olefin feed containing ethylene and propylene which comprises contacting the said mixed olefin feed with isobutane and aluminum chloride-hydrocarbon complex containing about 38–45% hydrocarbons in a first reaction stage at temperatures within the range of from about 50–90° F. whereby the isobutane is alkylated by the propylene, withdrawing the propylene alkylate product, withdrawing the unreacted ethylene as a gas from the first stage and contacting said ethylene in a second stage with isobutane and aluminum chloride-hydrocarbon complex containing about 35–40% hydrocarbons at temperatures in the range of 90–150° F. whereby the isparaffin is alkylated with the ethylene, and recovering from said second stage an ethylene alkylate product.

CHARLES H. WATKINS.
RICHARD N. MEINERT.

REFERENCES CITED

The following references are of record in the file of this patent:

UNITED STATES PATENTS

| Number | Name | Date |
|---|---|---|
| 2,308,561 | Marschner et al | Jan. 19, 1943 |
| 2,361,368 | Evering et al | Oct. 31, 1944 |
| 2,320,293 | Ostergaard | May 25, 1943 |

FOREIGN PATENTS

| Number | Country | Date |
|---|---|---|
| 496,273 | British | Nov. 25, 1938 |